Dec. 31, 1968          J. P. VERGEZ, JR          3,419,780
STATIC SYNTHETIC SINE WAVE INVERTER
Filed March 31, 1966                    Sheet 1 of 5
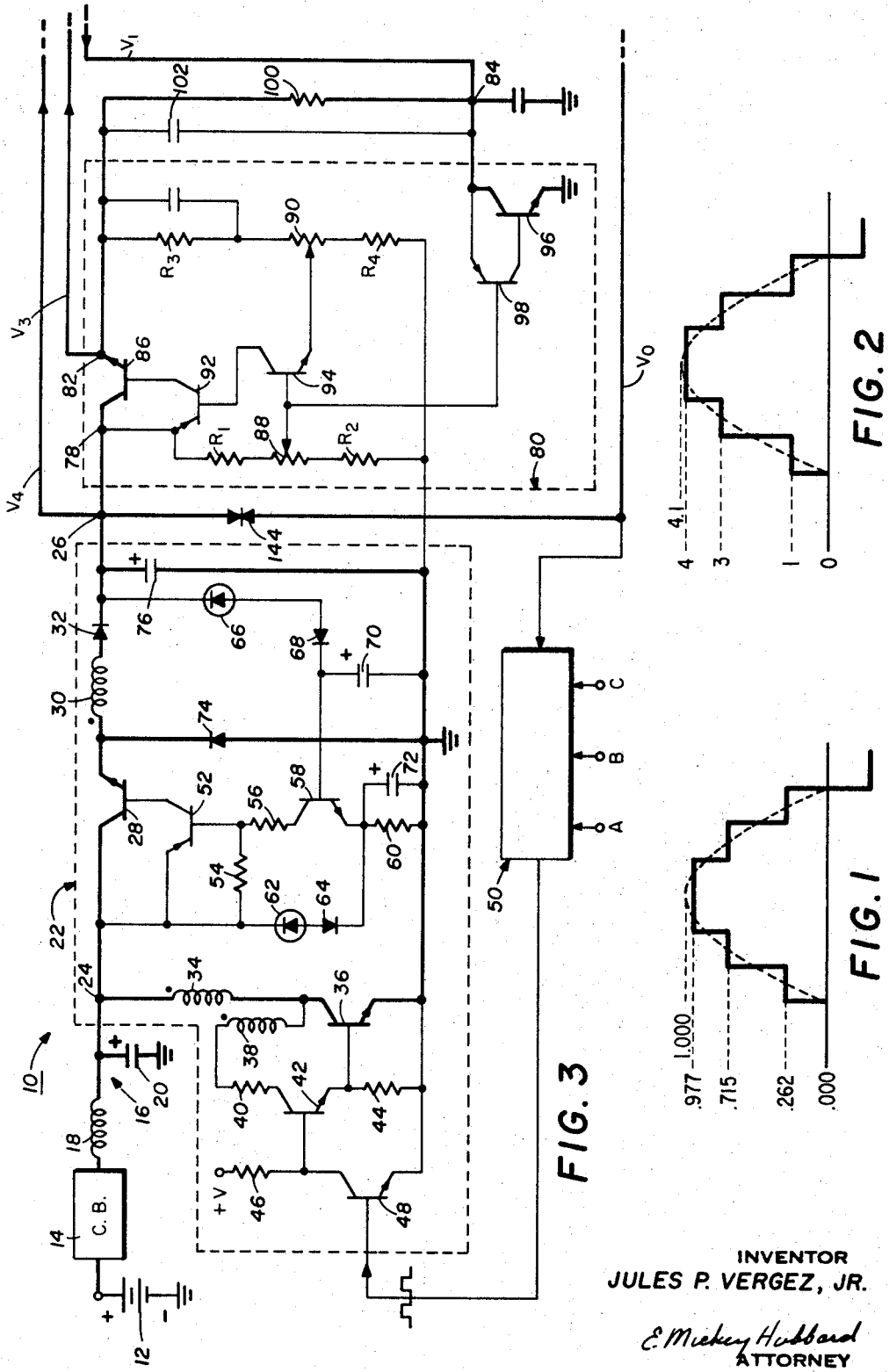
INVENTOR
JULES P. VERGEZ, JR.
E. Mickey Hubbard
ATTORNEY Dec. 31, 1968  J. P. VERGEZ, JR  3,419,780
STATIC SYNTHETIC SINE WAVE INVERTER
Filed March 31, 1966  Sheet 3 of 5

OUTPUT WAVEFORM WITHOUT FILTER

OUTPUT WAVEFORM WITH FILTER

INVENTOR
JULES P. VERGEZ, JR.

E. Mickey Hubbard
ATTORNEY

INVENTOR
JULES P. VERGEZ, JR.

ATTORNEY

United States Patent Office 3,419,780
Patented Dec. 31, 1968

3,419,780
STATIC SYNTHETIC SINE WAVE INVERTER
Jules Paul Vergez, Jr., Richardson, Tex., assignor to Texas Instruments Incorporated, Dallas, Tex., a corporation of Delaware
Filed Mar. 31, 1966, Ser. No. 539,154
19 Claims. (Cl. 321—2)

ABSTRACT OF THE DISCLOSURE

Apparatus which produces a step approximated sine wave power from a D.C. power supply which generates a plurality of voltage levels corresponding to the step levels of one half cycle of the step approximated sine wave, including a reference level representing the zero level of the sine wave. The D.C. power supply includes a first voltage regulator for producing a substantially constant first voltage under varying load conditions. A ratio regulator coupled to the voltage regulator maintains the remaining voltage levels at predetermined percentages of the first voltage level whereby each of the voltage levels will be changed in a proportional amount due to changes in load conditions, thereby presenting an undistorted output waveform. The various voltage levels are selectively connected to a plurality of output terminals by means of a logic control circuit. The logic control circuit connects the various voltage levels to the outputs in a predetermined, repetitive sequence to produce a step approximated sine wave voltage between pairs of the output terminals.

---

This invention relates generally to inverters, and more particularly, but not by way of limitation, relates to a static inverter for changing a D.C. voltage to a synthetic three phase sinusoidal power supply.

Numerous devices for inverting D.C. power to obtain A.C. power have been proposed, some of which produce a synthetic sine wave. It is believed that substantially all, if not all, inverters presently used to produce sine wave A.C. power for commercial applications, and in particular for three phase applications, require the use of transformers. Inverters using transformers have relatively poor efficiency and therefore generate excess heat, and are relatively heavy and bulky so as to be somewhat unsuitable for some uses, such as for example space applications.

Therefore, an important object of this invention is to provide an improved static inverter.

Another object is to provide an inverter which may be relatively small, lightweight and entirely solid state.

Another object of this invention is to provide such an inverter having an improved overall efficiency.

Still another object is to provide a system for producing a three phase sinusoidal output from a single voltage supply.

A further object is to provide an inverter requiring a minimum of output filtering to produce a usable sinusoidal three phase power supply.

Yet another object is to provide a direct coupled inverter system which eliminatese the necessity of using transformers.

A further object is to provide an inverter capable of driving either a resistive or inductive load.

Yet another object is to provide an inverter having automatic overload protection by regulating the voltage from a selected value down to substantially zero in the event of an overload or short circuit.

Still another object is to provide a voltage regulator for efficiently producing a D.C. voltage greater than a D.C. voltage supply, yet providing a means for reducing the voltage substantially to zero in the event of an overload condition.

Another object is to provide an inverter wherein the waveform is not distorted by changes in the magnitude of a reference voltage.

In a preferred embodiment of the invention, these and other objects are accomplished by an inverter having at least two outputs. D.C. power supply means is provided having a plurality of voltage levels including a reference potential which will ordinarily be ground potential. Switching means is provided for selectively connecting each of the outputs to each of the voltage levels of the D.C. power supply, and logic means is provided for selectively controlling the switching means in a predetermined, repetitive sequence to produce a step approximated sine wave between the outputs. When only two outputs are used, one output is connected to ground and the other output successively connected to the various voltage levels of the power supply to produce one half cycle of the approximated sine wave. Then said other output is connected to ground and said one output is successively connected to the various voltage levels to produce the other half of the approximated sine wave. When three outputs are used, the various outputs are successively connected either to ground or to the various voltage levels in such a combination as to produce, between each pair of outputs, a step approximated sine wave, and the sine waves between the various outputs are in a phase relationship such that the instantaneous value of the voltage is zero.

In accordance with a more specific aspect of the invention, the various voltage levels of the D.C. power supply are derived from a single constant voltage supply source by ratio regulator means so that the various voltage levels are some fractional portion of the single constant voltage supply source.

In accordance with another aspect of the invention, the single constant voltage supply source is comprised of voltage regulation means deriving its power from a D.C. source, the output of the regulation means being determined by feedback from the output of the inverter.

The invention also contemplates a novel voltage regulator wherein a battery supply voltage is stepped up to produce a higher regulated voltage. This is achieved by a duty cycle modulated primary loop which is controlled by feedback from the inverter output and which is inductively coupled to an output loop. The output loop normally includes the battery so that only the difference between the battery voltage and the output voltage is provided by inductive coupling. Under excessive load conditions, the battery power supply is automatically switched out of the output loop so that the output voltage is derived entirely by inductive coupling from the duty cycle modulated primary loop, thus permitting the output voltage to be reduced essentially to zero value by modulation of the duty cycle of the primary loop.

The novel features believed characteristic of this invention are set forth in the appended claims. The invention itself, however, as well as other objects and advantages thereof, may best be understood by reference to the following detailed description of an illustrative embodiment, when read in conjunction with the accompanying drawings, wherein:

FIGURE 1 is a schematic drawing illustrating a preferred synthetic waveform used in the embodiment of this invention hereafter described;

FIGURE 2 is a schematic drawing illustrating a simplified version of the waveform of FIGURE 1;

FIGURE 3 is a schematic circuit diagram of a portion of a static inverter constructed in accordance with the present invention;

Figure 4:
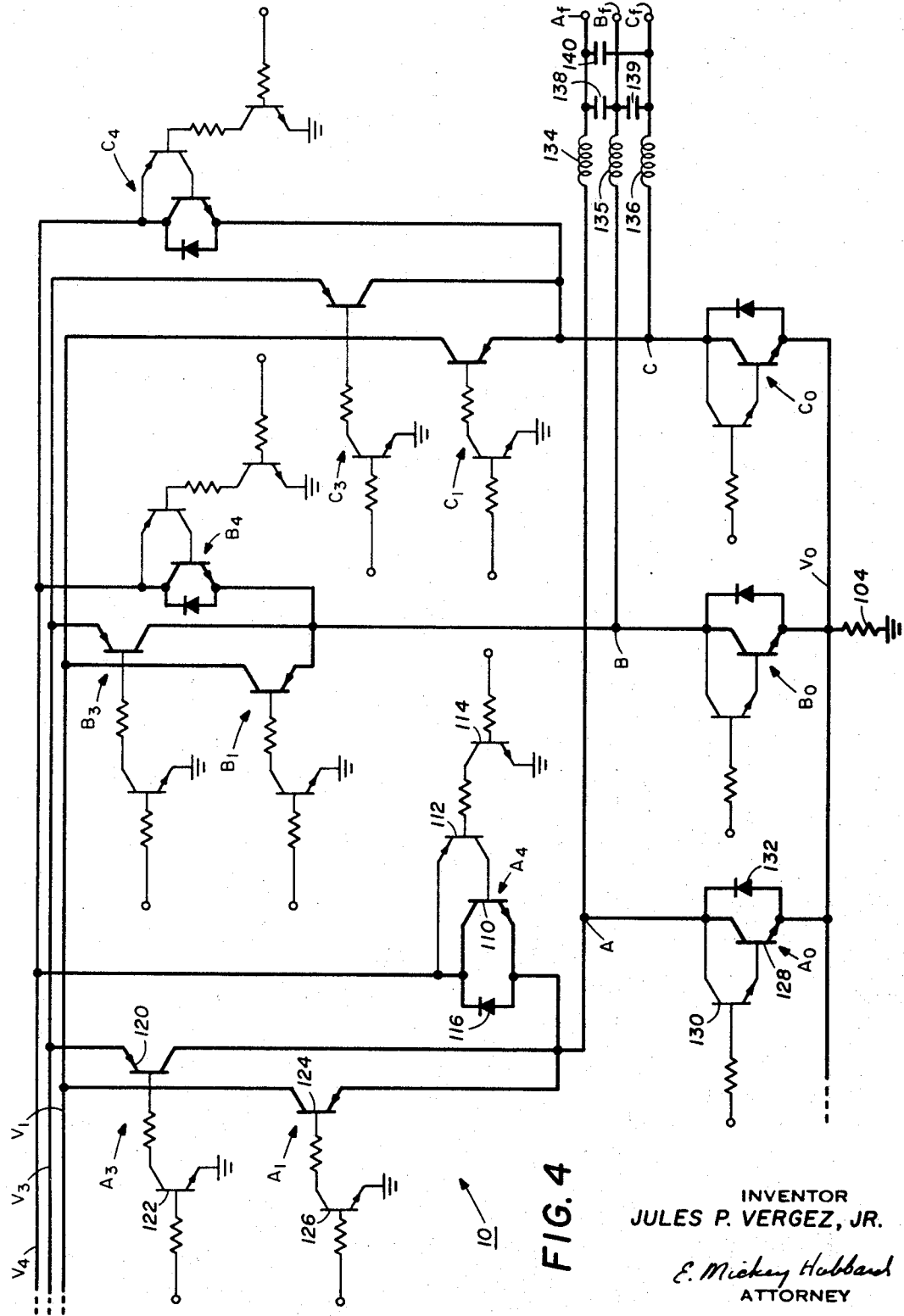
FIGURE 4 is a schematic circuit diagram of another portion of the static inverter constructed in accordance with the present invention.

The inverter of the present invention may be operated so as to produce any one of several synthetic sine waves. However, the one illustrated in FIGURE 1 is chosen for the particular embodiment herein described in detail because the waveform has the advantages of eliminating all harmonics below the eleventh and of requiring relatively simple logic for implementation. Assuming that the peak voltage for the sine wave is one volt, or unity, then the approximated waveshape goes to 0.262 volt at zero phase angle, to 0.715 volt at 30°, to 0.977 volt at 60°, back to 0.715 volt at 120°, back to 0.262 volt at 150° and then to —0.262 volt at 180° to repeat the steps but with negative voltages at the corresponding angles during the last 180° of the cycle. The Fourier expression for this waveform is:

$$V(t) = \sin \omega t + 1/11 \sin \omega t + 1/13 \omega t + 1/23 \sin 23 \omega t + 1/25 \sin 25 \omega t + 1/35 \sin \omega t = 1/37 \omega t + \ldots \quad (1)$$

For this waveshape, $F(x)$ is equal to $-F(x \pm \pi)$. Thus, it should be noted that only odd harmonics are present. In a three phase system, the instantaneous sum of the three voltages should always equal zero. This means that the following harmonics $V_f$ would not be present in the system:

$$V_f = 3, 9, 15, 21, 27 + \ldots 3[1+2(n-1)] \quad (2)$$

where $n$ is any positive integer. The remaining odd harmonics $$H_o = 1, 5, 7, 11, 13, 17, 19 + \ldots [3n + 1/2(-1)^n - 3/2] \quad (3)$$

are not objectionable from the standpoint of operation in a three phase system. The distortion for this waveform is 15.2%. Removing all the harmonics to the eleventh allows the use of a simple second order filter to bring the distortion down to 5%. In order to simplify explanation of the inverter hereafter described and claimed, the waveform of FIGURE 1 may be considered as the waveform illustrated in FIGURE 2. Thus, it will be noted that the four voltage levels in the waveform of FIGURE 2 are in the ratio 4:3:1:0.

Referring now to FIGURES 3 and 4, an inverter device constructed in accordance with the present invention is indicated generally by the reference numeral 10. The inverter device 10 is driven from a D.C. power supply, such as a battery 12, which is connected through a circuit breaker 14 to a conventional input filter 16 which is comprised of an inductance 18 and a capacitance 20.

The output of the filter 16 is connected to the input 24 of a novel voltage regulator, indicated generally by the reference numeral 22. The input junction 24 is connected through a transistor 28, secondary winding 30 of a transformer and a rectifying diode 32 to an output junction 26, which in conjunction with the batery 12 and inverter load comprise a secondary loop for purposes which will hereafter be described. The input junction 24 is also connected through the primary winding 34 of the transformer and a transistor 36 to ground which, in conjunction with the battery 12, form a primary duty cycle modulated loop. The output voltage of the regulator 22 is determined primarily by the duty cycle of the transistor 36. The transistor 36 is turned on by a network including a secondary winding 38 which is inductively coupled to winding 34, resistor 40, transistor 42, resistor 44, and resistor 46 which is connected to a positive collector supply voltage, and transistor 48. As will hereafter be described in greater detail, feedback from the output of the inverter is applied to a voltage controllable one shot multivibrator 50 which produces a pulse train of uniform frequency in which the width of the positive pulses varies directly with the output voltage of the inverter. In the event the voltage at the output 26 falls below the voltage at the input 24 as a result of an overload or short circuit, transistor 28 is turned off by the network comprised of transistor 52, resistors 54 and 56, transistor 58, resistor 60, Zener diode 62, rectifying diode 64, Zener diode 66 and rectifier diode 68. Capacitors 70 and 72 are provided for filter purposes. When transistor 28 is turned off, rectifying diode 74 permits secondary winding 30 to discharge through the load. The inductance of the winding 30 and the capacitor 76 form an output filter. The operation of the voltage regulator 22 can best be understood after a description of the operation of the inverter.

The constant voltage output 26 of regulator 22 is connected to the input 78 of a ratio regulator indicated generally by the reference numeral 80 which has outputs 82 and 84. The input 78 is connected to the output 82 by a transistor 86. A voltage divider is formed by resistors $R_1$ and $R_2$ connected between the input terminal 78 and ground, and another voltage divider is formed by resistors $R_3$ and $R_4$ connected between the output terminal 82 and ground. A variable resistor 88 is connected between resistors $R_1$ and $R_2$ for adjustment purposes and the portions of the resistor 88 on either side of the sliding contact may be considered as a part of the resistance of resistors $R_1$ and $R_2$ for calculation purposes. Similarly, a variable resistor 90 is connected between resistors $R_3$ and $R_4$ for adjustment purposes, but may be considered a portion of the resistors $R_3$ and $R_4$. Transistor 86 is a current source for the output 82 and is controlled by transistor 92 which is connected to form a Darlington pair with transistor 86. The base of transistor 92 is connected to the collector of transistor 94. The base of transistor 94 is connected to the sliding contact of resistor 88, and therefore may be considered as connected between resistors $R_1$ and $R_2$. The emitter of transistor 94 is connected to the sliding contact of variable resistor 90 and therefore may be considered as connected between resistors $R_3$ and $R_4$. Transistors 96 and 98 are connected in Darlington pair configuration and form a current sink for the output 84. The base of transistor 98 is also connected to the sliding contact of resistor 88.

If the voltage at the output 82 with respect to the voltage at the input 78 drops, the voltage at the emitter of transistor 94 drops while the voltage at the base of transistor 94 remains constant. Transistor 94 therefore tends to turn on which tends to turn transistors 92 and 86 on, thereby raising the voltage at the output 82. The converse happens if the voltage of the output 82 with respect to input 78 rises. If the voltage at the output 84 with respect to input 78 tends to rise, transistor 98 tends to turn on because the voltage at the base of transistor 98 remains constant, and transistor 96 tends to turn on thus tending to maintain the voltage at the output 84 constant. The converse applies when the potential of the output 84 with respect to the input 78 tends to fall. If the voltage at the input 78 rises, transistors 94, 92 and 86 will all become more conductive, thereby raising the potential at output 82 by a proportionate amount. Since the voltage at the base of transistor 98 is taken from the voltage divider formed by the resistors $R_1$ and $R_2$, transistors 98 and 96 will be less conductive and the potential at the output 84 wil also be raised by a proportional amount. Thus, the voltages at the outputs 82 and 84 are always proportional to the voltage at the input 78, the ratios being determined by the values of resistors $R_1$–$R_4$. In order to produce the waveform of FIGURE 2, the voltages at the outputs 26, 82 and 84 are 4:3:1 and for this reason the power buses connected to these outputs are designated $V_4$, $V_3$ and $V_1$.

A resistor 100 is connected between the outputs 82 and 84 so as to trade current between the power buses under special load conditions which will hereafter be described in greater detail. A capacitor 102 is connected parallel to the resistor 100 for filtering purposes.

Referring now to FIGURE 4, inverter outputs A, B and C may be selectively connected to the constant voltage power buses $V_4$, $V_3$ and $V_1$ and to ground bus $V_0$, which is connected through a small overload current sensing resistor 104 to ground, in a sequence which will hereafter be described to produce the desired synthetic waveforms between the respective outputs. For example, output A may be selectively connected to bus $V_4$ by switch $A_4$, but $V_3$ by switch $A_3$, bus $V_1$ by switch $A_1$ and to bus $V_0$ by switch $A_0$. Similiarly, output B may be selectively connected to buses $V_4$, $V_3$, $V_1$ and $V_0$ by switches $B_4$, $B_3$, $B_1$ and $B_0$, respectively, and output C may be selectively connected to buses $V_4$, $V_3$, $V_1$ and $V_0$ by switches $C_4$, $C_3$, $C_1$ and $C_0$.

Switches $A_4$, $B_4$ and $C_4$ are identical and each is comprised of transistors 110 and 112 connected in Darlington pair configuration, and control transistor 114. When the base of any one of the transistors 114 is at a logic "1" level, i.e., a positive potential, the switch will be turned on. A diode 116 is connected in shunt around the transistor 110 to bypass inductive kicks so that the inverter device may be used to drive inductive as well as resistive loads. It will be noted that transistors 110 are connected to supply current to the respective outputs.

Switches $A_3$, $B_3$ and $C_3$ are each comprised of a bilateral transistor 120 and a control transistor 122. Transistors 120 should be bilateral so that inductive kicks from the load will pass through the transistor and so that under certain imbalanced load conditions the power bus $V_3$ can act as a current sink as well as a current source. When a positive potential, corresponding to a logic "1" level, is applied to the base of any one of the transistors 122, transistors 122 and 120 are turned on.

Switches $A_1$, $B_1$ and $C_1$ are each comprised of a bilateral transistor 124 and a control transistor 126. It will be noted that transistors 124 are connected to transfer conventional current from the respective outputs to bus $V_1$ because as will hereafter be described in greater detail, but $V_1$ is normally a current sink, rather than a current source. When a positive potential representing a logic "1" level is applied to the base of any one of the transistors 126, the corresponding switch will be turned on. Transistor 124 is bilateral in order to pass inductive kicks from a load and to act as a current source under certain imbalanced load conditions.

Switch $A_0$ is comprised of transistors 128 and 130 connected in Darlington pair configuration. Bus $V_0$ always acts as a current sink and transistor 128 is oriented to conduct current from output A to bus $V_0$. A diode 132 is connected in shunt around transistor 128 to pass inductive kicks. When the base of any one of the transistors 130 is made positive to correspond to a logic "1" level, the switch is turned on.

The outputs A, B and C are connected through inductors 134, 135 and 136 to filter outputs $A_f$, $B_f$ and $C_f$. Capacitors 138, 139 and 140 are connected between outputs $A_f$ and $B_f$, $B_f$ and $C_f$, and $C_f$ and $A_f$, respectively. The combination of the inductors and capacitors thus forms a simple second order filter for the waveforms appearing at outputs A, B and C.

A protective double diode 144 (see FIGURE 3) is connected between buses $V_4$ and $V_0$ to prevent the voltage between the two buses from becoming excessive.

The current through the sensing resistor 104 is sensed as a voltage and applied to the feedback control circuit 50. The resistor 104 is very small. After the current through the resistor has increased above a preselected safe value, the voltage increase of bus $V_0$ is sufficient to cause an increase in the width of the positive pulses from the feedback control circuit 50 and thereby decrease the duty cycle of transistor 36 and consequently the voltage at the output 26, as will hereafter be described in greater detail. The outputs A, B and C are also connected back to the feedback control circuit 50 where the three phase output is rectified and compared with a reference potential. As the output voltage increases, the width of the positive pulses applied to the base of transistor 48 increases, thereby reducing the period of time that transistor 36 is turned on. The design and operation of a control circuit 50 is conventional and well known and does not constitute a part of the present invention. Thus, the duty cycle of transistor 36, which is essentially that percentage of time during which the potential applied to the base of transistor 48 is at ground potential, decreases as the average voltage at the outputs A, B and C increases, and also decreases as the current through the resistor 104 increases above a selected minimum value.

Figure 5:
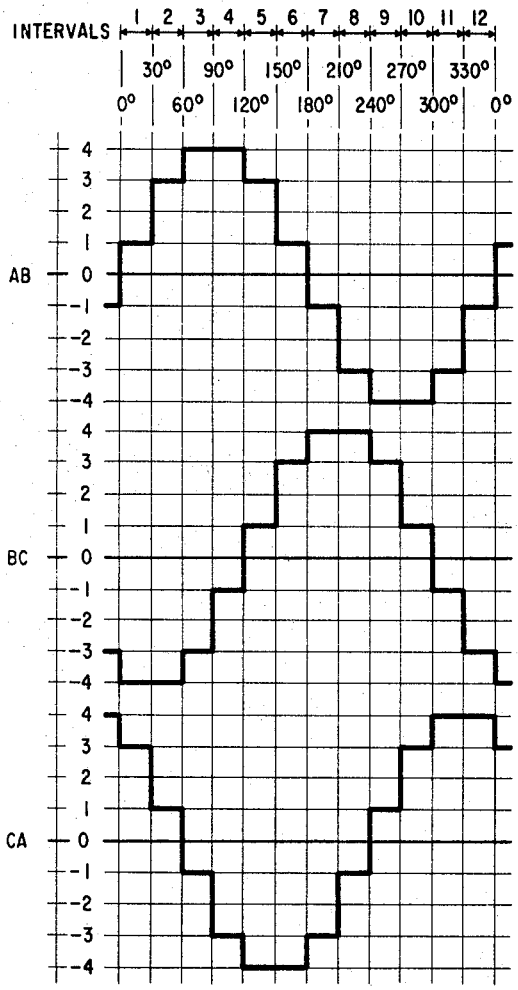
FIGURE 5 is a schematic drawing representing the three phase output of the inverter of FIGURES 3 and 4.
Figure 6:
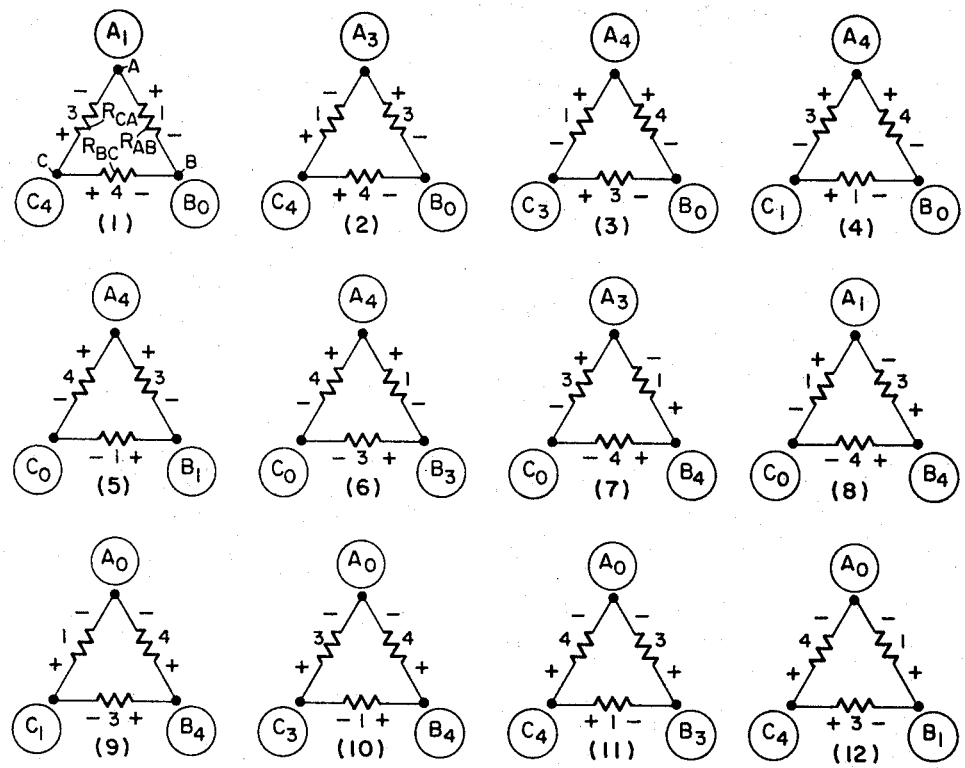
FIGURE 6 is a series of twelve schematic drawings which serve to illustrate the operation of the inverter of FIGURES 3 and 4.
Figure 7:
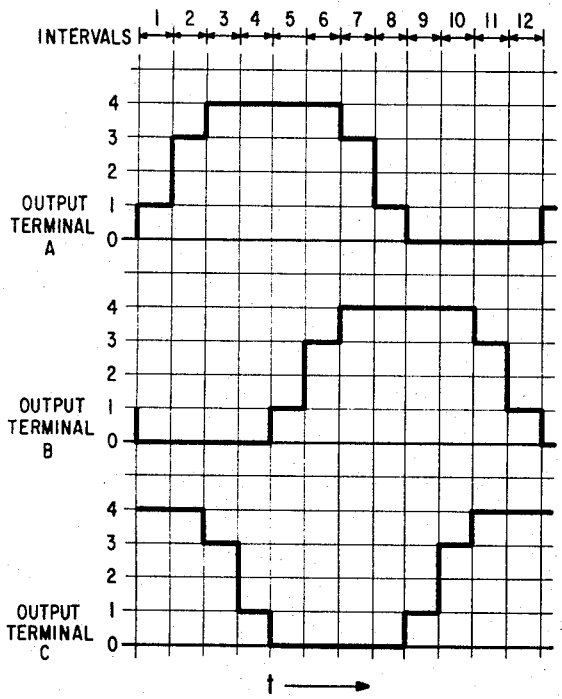
FIGURE 7 is a schematic drawing which serves to further illustrate the operation of the inverter of FIGURES 3 and 4.

Implementation of the waveform illustrated in FIGURE 2 as a three phase system between the outputs AB, BC and CA is represented by the three waveforms shown in FIGURE 5, which represents the phase-to-phase voltage as compared to the phase-to-ground voltage represented in FIGURE 7. It will be noted that a complete cycle of the waveform between each pair of outputs is divided into twelve equal periods of 30°. It will also be noted that the sum of the voltages during each period is zero. Assuming that equal load resistors $R_{AB}$, $R_{BC}$, and $R_{CA}$ are connected between terminals AB, BC and CA, respectively, then the voltages between the terminals A, B and C during period 1 must be as represented in FIGURE 6 (1). Thus during period 1 the potential at output A is one volt greater than the potential at output B and three volts less than the potential a output C. The potential at output C is four volts greater than that at output B. From FIGURE 6 (1) it is evident that switches $A_1$, $B_0$ and $C_4$ must be turned on, and this condition is represented by the circled reference characters $A_1$, $B_0$ and $C_4$ in FIGURE 6 (1). The conditions for periods 2–12 are similarly illustrated in FIGURE 6 (2)–6 (12). From FIGURE 6, the potential of the outputs A, B and C with respect to ground can be determined for each period, and this is presented by the waveform shown in FIGURE 7.

Figure 8:
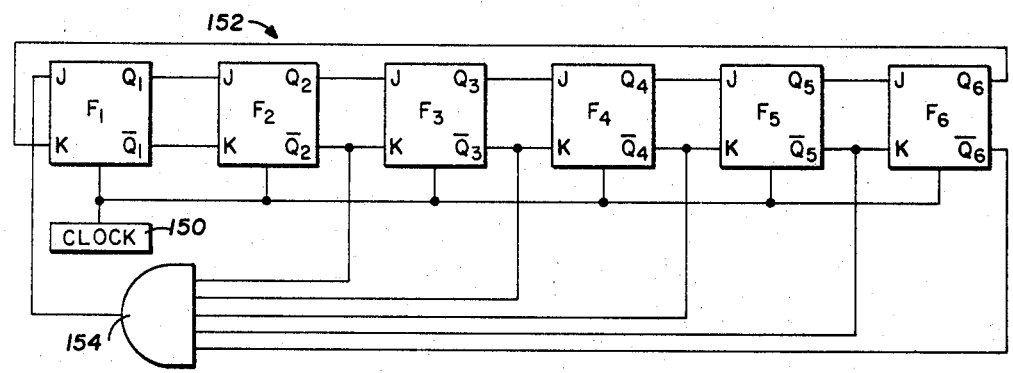
FIGURE 8 is a schematic logic diagram of the counter of the logic system for controlling the inverter of FIGURES 3 and 4.
Figure 9:
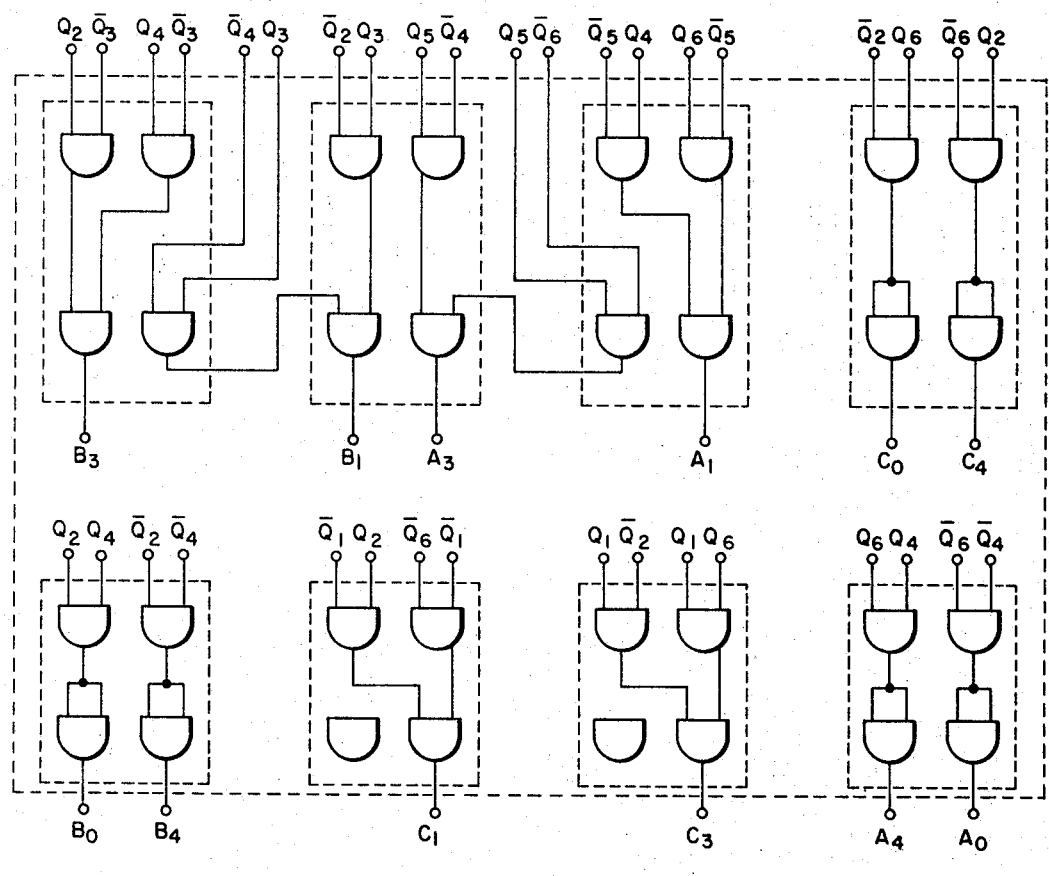
FIGURE 9, is a schematic logic diagram of the logic gates of the logic system for controlling the inverter of FIGURES 3 and 4.

The switches $A_4$, $A_3$, $A_1$, $A_0$, $B_4$, etc. may be operated in the proper sequence to produce the voltages represented in FIGURE 7 by the logic circuitry illustrated in FIGURES 8 and 9. Referring to FIGURE 8, a clock source 150 produces clock pulses at a rate equal to twelve times the frequency of the output of the inverter 10. These clock pulses cause the binary stages $F_1$–$F_6$ of a Johnson counter, indicated by the reference character 152, to successively complement from a logic "0" state to a logic "1" state and then to successively complement back to a logic "0" state to provide twelve logic combinations at the outputs of the binaries representative of the twelve periods. Assume that initially all of the binary stages $F_1$–$F_6$ are in the logic "0" state so that the complement outputs $\overline{Q}_1$–$\overline{Q}_6$ are at a logic "1" level and the true outputs $Q_1$–$Q_6$ are at a logic "0" level. Then as a result of the output from the AND gate 154, the true output $Q_1$ of binary $F_1$ would go to a logic "1" level on the next clock pulse and output $\overline{Q}_1$ would go to a logic "0" level. Then outputs $Q_2$–$Q_6$ would go to the logic "1" level on the next five successive clock pulses and outputs $\overline{Q}_2$–$\overline{Q}_6$ would go to logic "0" level. After ouput $Q_6$ goes to a logic "1" level, the binary $F_1$ would be complemented on the next clock pulse so that output $Q_1$ would go to a logic "0" level and output $\overline{Q}_1$ would go to a logic "1" level. Then the outputs $Q_2$–$Q_6$ would successively go to a logic "0" level on the next five clock pulses as outputs $\overline{Q}_2$–$\overline{Q}_6$ go to the logic "1" level. The twelfth period is arbitrarily selected as that condition when outputs $Q_1$–$Q_3$ are at a logic "1" level and outputs $Q_4$–$Q_6$ are at a logic "0" level. Then periods 1–3 are represented as outputs $Q_4$–$Q_6$ successively change to a logic "1" level, periods 4–9 as outputs $Q_1$–$Q_6$ return to a logic "0" level, and periods 10–12 as outputs $Q_1$–$Q_3$ return to a logic "1" level.

The inputs to the array of AND gates illustrated in FIGURE 9 are connected to the various outputs of the binaries $F_1$–$F_6$ and the outputs are connected to the switches $A_4$, $A_3$, $A_1$, $A_0$, $B_4$, etc. as indicated. Thus, when all inputs to a particular set of AND gates associated with an output are at a logic "1" level, the output goes to a logic "1" level, thus turning the corresponding switch on. For example, it will be noted from FIGURE 7 that switch $A_4$ should be turned on for periods 3–6 so as to connect output terminal A to bus $V_4$ during those periods. This is accomplished merely by ANDing the outputs $Q_6$ and $Q_4$. $Q_6$ is at a logic "1" level for periods 3–8 and output $Q_4$ is at a logic "1" level for periods 1–6. Thus, both outputs $Q_4$ and $Q_6$ are at a logic "1" level only for periods 3–6. The logic for the remaining switches may be determined in the same manner, but will not be described in detail. Of course, other logic arrangements can be used to control the twelve switches in the desired sequence.

Figure 10:
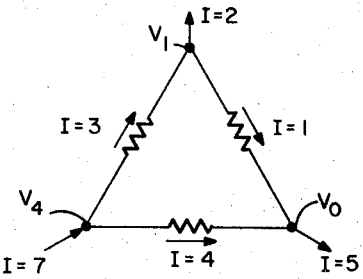
FIGURE 10 is a schematic drawing which serves to illustrate one balanced load condition of the inverter of FIGURES 3 and 4.
Figure 11:
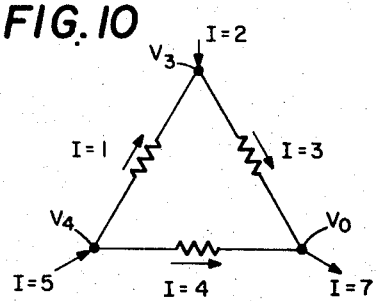
FIGURE 11 is a schematic drawing which serves to illustrate the other balanced load condition on the inverter of FIGURES 3 and 4.

Assuming that the loads $R_{AB}$, $R_{BC}$ and $R_{CA}$ are equal, it will be noted from FIGURE 6 that only two different load conditions exist for the power buses $V_4$, $V_3$, $V_1$ and $V_0$. Buses $V_4$ and $V_0$ are always connected to one of the outputs A, B or C. Bus $V_3$ is connected to one of the outputs for six periods, and bus $V_1$ is connected to one of the outputs for the other six periods. FIGURE 10 represents the load conditions when buses $V_4$, $V_1$ and $V_0$ are connected to the three outputs. Assuming that the load resistors each have a unit value, then three units of current flow from terminal C to terminal A, four units of current flow from terminal C to terminal B and one unit of courrent flows from terminal A to terminal B. Power bus $V_4$ must therefore supply seven units of current, bus $V_1$ must sink two units of current, and bus $V_0$ must sink five units of current. When buses $V_4$, $V_3$ and $V_0$ are connected to the outputs as illustrated in FIGURE 11, bus $V_4$ must provide five units of current, bus $V_3$ must supply two units of current, and bus $V_0$ must sink seven units of current. Thus, it will be noted that voltage supplies $V_4$ and $V_3$ must be current sources while voltage supplies $V_1$ and $V_0$ must be current sinks thus the voltage regulator 22 is the current source for bus $V_4$, transistor 86 is the source for bus $V_3$, and transistor 96 is the current sink for bus $V_1$.

From an examination of FIGURE 10, it will be noted that if the resistance between buses $V_4$ and $V_1$ is more than three times the resistance between buses $V_1$ and $V_0$, the current from bus $V_4$ to bus $V_1$ is less than unity and bus $V_1$ would not sink current during this interval, but would be required to supply current to bus $V_0$. Failure of bus $V_1$ to supply current would result in some deterioration of the output waveshape. However, the waveshape is restored by allowing $V_1$ to sink a small amount of current passing through resistor 100 from bus $V_3$. Similarly, from FIGURE 11 it will be noted that if the resistance between buses $V_3$ and $V_0$ is more than three times the resistance between buses $V_4$ and $V_3$, bus $V_3$ must become a current sink rather than a current source. In this case, the resistor 100 will transfer current from bus $V_3$ to the bus $V_1$ and transistor 96 will sink the excess current.

Figure 12:
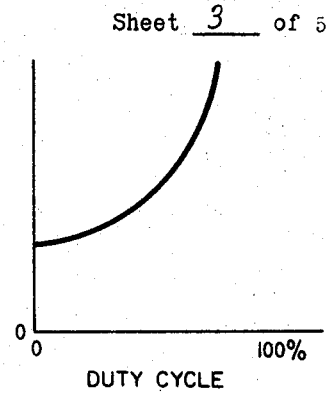
FIGURES 12 and 13 are graphs illustrating the operation and advantages of the voltage regulator illustrated in FIGURE 3.
Figure 13:
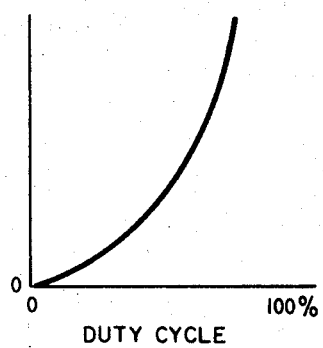

It will be noted that a single positive voltage source, battery 12, is used for the inverter 10. A typical value for the voltage source 12 is 28 volts. A typical value for the voltages on buses $V_4$, $V_3$ and $V_1$ is +40 volts, +30 volts and +10 volts. The voltage regulator 22 steps up the voltage of the source 12 from 28 to 40 volts under normal operating conditions, and maintains the +40 volt level as a result of the feedback control circuit 50. As previously described, the voltage at the outputs A, B and C is fed back to the control circuit 50 which increases the width of the positive pulses applied to the base of transistor 48 as the output voltage increases, thus reducing the duty cycle of transistor 36. When the base of transistor 48 is positive, transistor 48 is turned on and transistor 36 is turned off. When the base of transistor 48 returns to ground potential, transistor 48 is turned off and transistors 42 and 36 are turned on. The battery 12 then charges the primary winding 34 through transistor 36 to ground. When the next positive pulse reaches the base of transistor 48, transistor 48 is turned on and transistors 42 and 36 are turned off. As a result of the collapsing current in the winding 34, the voltage induced in the secondary winding 30 is added to the voltage from the battery 12 and is applied to output 26, because during normal operation transistor 28 is turned on. As the duty cycle, i.e., the period between the positive pulses, decreases, the primary winding 34 charges to a lesser degree and the voltage induced in secondary winding 30 is decreased, thereby decreasing the voltage at output 26, thus maintaining the voltage at output 26 at the constant selected value. During such normal operation, the inductive coupling between windings 34 and 30 supplies only the difference between the voltage of the supply 12 and the voltage at the output 26, so that operation of the regulator is relatively efficient. However, when operating in this efficient mode, the voltage at the output 26 can never fall below the voltage of the supply 12, as represented by the plot of the voltage at output 26 with respect to the duty cycle of transistor 36 in FIGURE 12. Thus, if the inverter should be overloaded, or should a short circuit occur, modulation of the duty cycle of transistor 36 could not reduce the voltage of $V_4$ to an extent sufficient to prevent damage to the inverter. Transistor 28 and diode 74 are provided to change the operation of the regulator 22 when the voltage at the output 26 falls below the voltage at the input 24. The values of the Zener diodes 62 and 66 are selected such that when the voltage at output 26 approaches the input voltage 24, transistor 58 is turned off, thereby turning transistors 52 and 28 off. The output 26 is then no longer connected to the voltage supply 12, and the total output voltage is supplied only by the inductive coupling between the primary winding 34 and the secondary winding 30. The discharge loop for the secondary winding 30 is then provided from ground through diode 74, the winding 30, diode 32 and the load, rather than from the voltage supply 12 as in the prior case. In an overload condition, excessive current must pass through resistor 104 and this produces a sufficient voltage drop to cause the control circuit 50 to reduce the duty cycle of transistor 36, thus reducing the voltage at output 26. When operating in this mode, the voltage at the output 26 with respect to the duty cycle of transistor 36 is represented by the plot in FIGURE 13 wherein it will be noted that the output voltage can be reduced to a value of zero by reducing the duty cycle to zero.

Although the voltages $V_4$, $V_3$ and $V_1$ are typically 40, 30 and 10 volts, the ratio regulator 80 may be operated so as to produce voltages at the buses $V_3$ and $V_1$ which are substantially any predetermined percentage of the voltage on bus $V_4$. The voltage on bus $V_1$ is approximately equal to the voltage at the sliding contact of resistor 88. Thus, assuming that the portions of the resistor 88 on either side of the sliding contact are lumped with the resistors $R_1$ and $R_2$, the voltage on the bus $V_1$ is:

$$V_1 \approx V_4 \left( \frac{R_2}{R_1 + R_2} \right) \qquad (4)$$

Thus, the selection of resistors $R_1$ and $R_2$ determines the relationship of the voltage $V_1$ to the voltage $V_4$. Under stable conditions, the voltage at the sliding contact of resistor 90 is approximately equal to the voltage at the sliding contact of resistor 88, differing only by the base-emitter voltage drop of transistor 94. Thus, the voltage on bus $V_3$ is approximately $$V_3 = V_4 \left( \frac{R_2}{R_1 + R_2} \right) \left( \frac{R_3 + R_4}{R_4} \right) \qquad (5)$$

The variable resistors 88 and 90 permit adjustments to make the voltages on buses $V_3$ and $V_1$ correspond to precisely the selected ratio.

Figure 14:
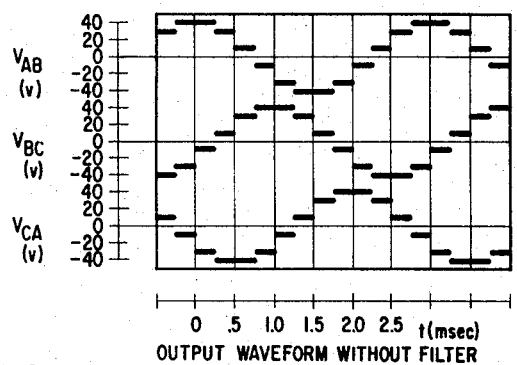
FIGURE 14 is a representation of the output of the inverter of FIGURES 3 and 4 as seen on an oscilloscope without the use of output filters.
Figure 15:
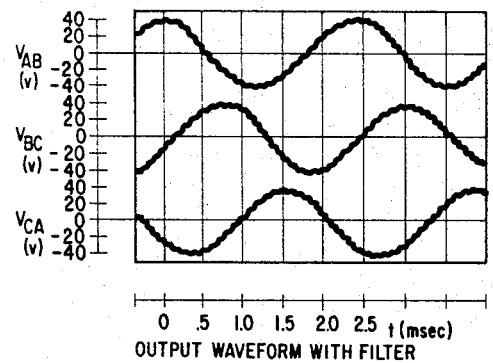
FIGURE 15 is a drawing illustrating the output of the inverter of FIGURES 3 and 4 as seen on an oscilloscope when output filters are used.

From the above detailed description of a preferred embodiment of the invention, it will be noted that a three phase power supply is produced from a single positive voltage source. The peak voltage of the power supply is greater than the voltage of the D.C. source. The system has protection against overloading, yet is efficient under normal operating conditions. The waveforms at outputs A, B and C as they appear on an oscilloscope are illustrated in FIGURE 14. The waveforms at the filter outputs $A_f$, $B_f$ and $C_f$ as they appear on an oscilloscope are illustrated in FIGURE 15. The inverter device does not use any transformers, except in the voltage regulator, is completely solid state, and is relatively compact and lightweight. The inverter can be used to drive both resistive and inductive loads connected in either a $\Delta$ or a Y configuration. Changes in the voltage supply do not distort the waveform because all voltage levels are determined as a percentage of the maximum voltage excursion. The inverter produces a three phase output in which the peak to peak voltage is almost three times the voltage of the single D.C. voltage source.

Although a preferred embodiment of the invention has been described in detail, it is to be understood that various changes, substitutions and alterations can be made therein without departing from the spirit and scope of the invention as defined by the appended claims.

What is claimed is:

1. An inverter for producing step approximated sine wave power from D.C. power comprising D.C. power supply means for producing a plurality of voltage levels corresponding to the step levels of one half cycle of the step approximated sine wave including a reference level representing the zero level of the sine wave, a plurality of outputs, logic controllable switching means for each of said outputs, said switching means selectively connecting an individual output to each of the voltage levels, and logic circuit means connected to control the switching means for operating the switching means in a predetermined, repetitive sequence to produce a step approximated sine wave voltage between each pair of outputs having both positive and negative values with respect to the reference level.

2. An inverter for producing step approximated sine wave power from D.C. power comprising D.C. power supply means for producing a plurality of voltage levels corresponding to the step levels of one half cycle of the step approximated sine wave including a reference level representing the zero level of the sine wave, a portion of the plurality of voltage levels being derived from a single constant voltage power supply by ratio regulator means, a plurality of outputs, logic controllable switching means for selectively connecting each of the outputs to each of the voltage levels, a logic circuit means connected to control the switching means for operating the switching means in a predetermined, repetitive sequence to produce a step approximated sine walve voltage between each pair of outputs having both positive and negative values with respect to the reference level.

3. The inverter defined in claim 2 wherein the D.C. power supply means has four voltage levels substantially in the ratio 4:3:1:0, and the power supply supplies current at the two larger voltage levels and sinks current at the two smaller voltage levels.

4. An inverter for producing step approximated sine wave power from D.C. power comprising D.C. power supply means for producing a plurality of voltage levels corresponding to the step levels of one half cycle of the step approximated sine wave including a reference level representing the zero level of the sine wave, said D.C. power supply including first voltage regulator means for producing a substantially constant first voltage level under varying load conditions for the inverter and a ratio regulator means for maintaining the remaining voltage levels at predetermined percentages of the first voltage level whereby each of the voltage levels will be changed in proportional amounts due to changes in the load condition and the output waveform will not be distorted, a plurality of outputs, logic controllable switching means for selectively connecting each of the outputs to each of the voltage levels, and logic circuit means connected to control the switching means for operating the switching means in a predetermined, repetitive sequence to produce a step approximated sine wave voltage between each pair of outputs having both positive and negative values with respect to the reference level.

5. The inverter defined in claim 4 wherein there are four voltage levels substantially in the ratio of 4:3:1:0.

6. The inverter defined in claim 5 wherein there are two outputs and the logic circuit means operates the controllable switching means in a sequence to connect one output to the zero voltage level and the other output to the lowest voltage level for one count, to the next highest volage level for one count, to the highest voltage level for two counts, to the said next highest voltage level for one count, and to said lowest voltage level for one count, then to connect said other output to the zero voltage level and to successively connect said one output to the lowest voltage level for one count, to the next highest voltage level for one count, to the highest voltage level for two counts, to said next highest voltage level for one count and to said lowest voltage level for one count to produce a step approximated sine wave between the two outputs.

7. An inverter for producing three phase, step approximated, sine wave power from D.C. power comprising a D.C. power supply means having a plurality of voltage levels corresponding to the step levels of one half cycle of the step approximated sine waves including a voltage representative of zero volts on the approximated sine waves, three inverter outputs, logic controllable switching means for selectively connecting each of the three inverter outputs to each of the voltage levels of the D.C. power supply means, and logic circuit means connected to control the switching means for operating the switching means in a predetermined, repetitive sequence to produce a step approximated sine wave between each pair of inverter outputs, the step approximated sine waves between the outputs being in predetermined phase relationship.

8. An inverter for producing three phase, step approximated, sine wave power from D.C. power comprising three inverter outputs, a D.C. power supply means having a plurality of voltage levels corresponding to the step levels of one half cycle of the step approximated sine waves including a voltage representative of zero volts on the approximated sine waves, said D.C. power supply means including first voltage regulator means responsive to the voltage at the inverter outputs for producing a voltage supply at a first level and ratio regulator means for producing at least one additional voltage level proportional to the first voltage level, logic controllable switching means for selectively connecting each of the three inverter outputs to each of the voltage levels of the D.C. power supply means, and logic circuit means connected to control the switching means for operating the switching means in a predetermined, repetitive sequence to produce a step approximated sine wave between each pair of inverter outputs, the step approximated sine waves between the outputs being in predetermined phase relationship.

9. The inverter defined in claim 8 wherein the ratio regulator means produces second and third voltage levels and the first, second, third, and reference voltage levels are in the ratio of substantially 4:3:1:0.

10. The inverter defined in claim 9 wherein the logic circuit means operates the switching means in a sequence to sequentially connect a first output to the third voltage level for one count, to the second voltage level for one count, to the first voltage level for four counts, to the second voltage level for one count, to the third voltage level for one count, and to the zero voltage level for four counts, to sequentially connect a second output during the corresponding twelve counts, to the zero voltage level for the first four counts, then to the third voltage level for one count, to the second voltage level for one count, to the first voltage level for four counts, to the second voltage level for one count, and to the third voltage level for one count, and to sequentially connect the third output during the corresponding twelve counts to the first voltage level for the first two counts, to the second voltage level for one count, to the third voltage level for one count, to the zero voltage level for four counts, to the third voltage level for one count, to the second voltage level for one count, and to the first voltage level for two counts.

11. The inverter defined in claim 7 wherein the D.C. power supply means comprises feedback voltage regulator means responsive to the voltage at the inverter outputs for producing a substantially constant voltage level at the output thereof and ratio regulator means responsive to the voltage level of the feedback voltage regulator means for producing at least one additional voltage level that is a predetermined ratio of the voltage level produced at the output of the feedback voltage regulator means.

12. The inverter defined in claim 11 wherein the feedback voltage regulator means comprises a D.C. voltage supply, a primary loop connected across the D.C. voltage supply including a primary winding and duty cycle switching means, control means connected to the duty cycle switching means and responsive to the voltage at the inverter outputs and responsive to excess current through a load connected to the inverter outputs for varying the duty cycle of the duty cycle switching means in inverse relationship to the voltage at the inverter outputs and in inverse relationship to the current through the load, a secondary loop connected to the D.C. voltage supply and including overload switching means, a secondary winding inductively coupled to the primary winding and completable through the load connected to the inverter outputs, means responsive to the voltage at the output of the feedback voltage regulator means for opening the overload switching means when the voltage at the output of the feedback voltage regulator means drops below a predetermined value, and rectifier means connected to complete a discharge loop through the secondary winding and the load when the overload switching means is open.

13. The inverter defined in claim 8 wherein at least one voltage level of the ratio regulator means is produced by the voltage drop across a first transistor the impedance of which is controlled by the collector current of a second transistor, the base and emitter of the second transistor being connected between taps of first and second voltage divider means, the first and second voltage divider means being connected between the collector of the first transistor and a reference voltage and the emitter of the first transistor and the reference voltage.

14. The inverter defined in claim 8 wherein at least one voltage level of the ratio regulator means is produced by the voltage drop across a first transistor the impedance of which is controlled by the collector current of a second transistor, the emitter of the second transistor being connected to the output of the ratio regulator means at which said voltage level is produced, and the base being connected to a tap of a voltage divider means connected between the input of the ratio regulator and a reference voltage.

15. The inverter defined in claim 8 wherein at least one voltage level of the ratio regulator means is produced by the voltage drop across a first transistor the impedance of which is controlled by the collector current of a second transistor, the base and emitter of the second transistor being connected between taps of first and second voltage divider means, the first and second voltage divider means being connected between the collector of the first transistor and a reference voltage and the emitter of the first transistor and the reference voltage and wherein at least one voltage level of the ratio regulator means is produced by the voltage drop across a third transistor the impedance of which is controlled by the collector current of a fourth transistor, the emitter of the fourth transistor being connected to the output of the ratio regulator means at which said voltage level is produced, and the base being connected to a tap of a voltage divider means connected between the input of the ratio regulator and a reference voltage.

16. The inverter defined in claim 15 wherein one of said first and second transistors supplies current to the respective output and the other receives current from the respective output, and further characterized by a resistance interconnecting the respective output for trading current between the outputs under imbalanced load conditions.

17. A voltage regulator comprising a D.C. voltage supply, a primary loop connected across the D.C. voltage supply including a primary winding and duty cycle switching means for opening and closing the primary loop, control means connected to control the duty cycle switching means, said control means being responsive to the voltage at the output of the regulator means and responsive to excess current through a load connected to the output for varying the duty cycle of the duty cycle switching means in inverse relationship to the voltage at the output and in inverse relationship to the current through the load, a secondary loop connected to the D.C. voltage supply including overload switching means and a secondary winding inductively coupled to the primary winding, the secondary loop being completable through a load connected to the output, means responsive to the voltage at the output for opening the overload switching means when the voltage at the output drops below a predetermined value, and rectifier means connected to complete a discharge loop through the secondary winding and a load connected to the output when the overload switching means is open.

18. The ratio voltage regulator having an input and first and second outputs, a first transistor connected between the input and the first output, the impedance of the first transistor being controlled by the collector current of a second transistor, the base and emitter of the second transistor being connected between taps of first and second voltage divider means, the first and second voltage divider means being connected between the input and a reference voltage and between the first output and the reference voltage, respectively, a third transistor connected between the second output and a reference voltage the impedance of which is controlled by the collector current of a fourth transistor, the emitter of the fourth transistor being connected to the second output and the base being connected to a tap of a voltage divider means connected between the input and a reference voltage.

13

19. The ratio voltage regulator defined in claim 18 wherein one of the first and third transistors supplies current to the respective first and second outputs and the other receives current, and further characterized by a resistance connected between the outputs for trading current under reverse current flow conditions.

References Cited

UNITED STATES PATENTS

| | | | |
|---|---|---|---|
| 1,691,986 | 11/1928 | Nyquist | |
| 3,052,833 | 9/1962 | Coolidge et al. | 321—5 |
| 3,100,851 | 8/1963 | Ross et al. | |
| 3,235,787 | 2/1966 | Gordon et al. | 323—22 |
| 3,344,340 | 9/1967 | Webb | 323—22 |

FOREIGN PATENTS 680,926  2/1964  Canada.

JOHN F. COUCH, *Primary Examiner.*

W. H. BEHA, JR., *Assistant Examiner.*

321—5, 14; 323—22; 307—81, 240